United States Patent
Anantharangachar et al.

(10) Patent No.: US 10,552,459 B2
(45) Date of Patent: Feb. 4, 2020

(54) CLASSIFYING A DOCUMENT USING PATTERNS

(71) Applicants: Hewlett Packard Enterprise Development LP, Houston, TX (US); Raghu Anantharangachar, Bangalore Karnataka (IN); Pradeep Chourasiya, Bangalore Karnataka (IN)

(72) Inventors: Raghu Anantharangachar, Bangalore Karnataka (IN); Pradeep Chourasiya, Bangalore Karnataka (IN)

(73) Assignee: Micro Focus LLC, Santa Clara, CA (US)

(*) Notice: Subject to any disclaimer, the term of this patent is extended or adjusted under 35 U.S.C. 154(b) by 794 days.

(21) Appl. No.: 15/027,776

(22) PCT Filed: Oct. 31, 2013

(86) PCT No.: PCT/IN2013/000677
§ 371 (c)(1),
(2) Date: Apr. 7, 2016

(87) PCT Pub. No.: WO2015/063784
PCT Pub. Date: May 7, 2015

(65) Prior Publication Data
US 2016/0246870 A1    Aug. 25, 2016

(51) Int. Cl.
*G06F 17/30* (2006.01)
*G06F 16/28* (2019.01)
*G06F 16/2457* (2019.01)

(52) U.S. Cl.
CPC ...... *G06F 16/285* (2019.01); *G06F 16/24578* (2019.01)

(58) Field of Classification Search
CPC ......... G06F 17/30705; G06F 17/30598; G06F 16/24578; G06F 16/285; G06F 16/35; G06F 16/353; G06F 16/355; G06F 16/358
(Continued)

(56) References Cited

U.S. PATENT DOCUMENTS

| | | | |
|---|---|---|---|
| 6,675,159 B1 * | 1/2004 | Lin | G06F 17/30707 707/999.003 |
| 7,426,509 B2 | 9/2008 | Evans et al. | |

(Continued)

FOREIGN PATENT DOCUMENTS

| | | |
|---|---|---|
| CN | 101059796 A | 10/2007 |
| CN | 102915315 A | 2/2013 |
| WO | WO-03040875 A2 | 5/2003 |

OTHER PUBLICATIONS

Pang, B., "Automatic Analysis of Document Sentiment", Aug. 2006.

*Primary Examiner* — Greta L Robinson

(57) ABSTRACT

A method for classifying a document using identified patterns includes determining frequent patterns based on a group of resources, where the frequent patterns include sets of words associated with resources that are related to a particular topic; determining frequent anti-patterns based on another group of resources, where the frequent anti-patterns include sets of words associated with resources that are not related to the particular topic, where the second group of resources is different from the first group of resources; determining a probability that the document is related to the particular topic based on the frequent patterns and the frequent anti-patterns; and determining a topic classification of the document based on the determined probability.

20 Claims, 6 Drawing Sheets

(58) Field of Classification Search
USPC .......................................................... 707/738
See application file for complete search history.

(56) References Cited

U.S. PATENT DOCUMENTS

| | | | |
|---|---|---|---|
| 7,801,887 | B2 | 9/2010 | Knepper et al. |
| 7,996,390 | B2 | 8/2011 | Freire et al. |
| 8,200,670 | B1* | 6/2012 | Flaster .................. G06F 16/355 |
| | | | 707/737 |
| 8,214,346 | B2 | 7/2012 | Pradhan et al. |
| 8,265,925 | B2 | 9/2012 | Aarskog |
| 9,069,768 | B1* | 6/2015 | Sampson .......... G06F 17/30705 |
| 2004/0230577 | A1* | 11/2004 | Kawatani ............. G06K 9/6218 |
| 2005/0240394 | A1* | 10/2005 | Oda ................... G06F 17/30707 |
| | | | 704/9 |
| 2006/0004561 | A1* | 1/2006 | Zhang ................. G06F 16/355 |
| | | | 704/4 |
| 2007/0239745 | A1* | 10/2007 | Guerraz ............ G06F 17/30705 |
| | | | 707/999.101 |
| 2008/0082481 | A1* | 4/2008 | Joshi ................. G06F 17/30705 |
| | | | 707/999.002 |
| 2009/0327243 | A1* | 12/2009 | Pradhan .................. G06F 16/93 |
| 2010/0114911 | A1* | 5/2010 | Al-Kofahi ......... G06F 17/30707 |
| | | | 707/748 |
| 2010/0306204 | A1* | 12/2010 | Chitiveli ........... G06F 17/30707 |
| | | | 707/752 |
| 2011/0265064 | A1* | 10/2011 | Hadar ....................... G06F 8/36 |
| | | | 717/121 |
| 2012/0117092 | A1* | 5/2012 | Stankiewicz ......... G06F 16/353 |
| | | | 707/755 |
| 2014/0156567 | A1* | 6/2014 | Scholtes ............. G06N 99/005 |
| | | | 706/12 |
| 2014/0280238 | A1* | 9/2014 | Cormack ............ G06N 99/005 |
| | | | 707/749 |
| 2015/0088876 | A1* | 3/2015 | Morimoto ......... G06F 17/30867 |
| | | | 707/728 |
| 2016/0147863 | A1* | 5/2016 | Anantharangachar ....................... |
| | | | G06F 16/353 |
| | | | 707/738 |

* cited by examiner

CLASSIFYING A DOCUMENT USING PATTERNS

BACKGROUND

To assist users with finding repository documents that are relevant to topics of their interests, documents are often classified into various categories. For example, an electronic database may include multiple documents that are categorized by their subject. In some instances, a user can navigate to documents that the user believes will be interesting using the document's classifications.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Classifying documents that belong to a certain topic in a document repository can be a tedious task. Examples of such a task may include identifying all the pages that describe a certain topic, such as a human service, in an online database or identifying all the web pages that describe the topic. The principles described herein include a method and a set of procedures to classify documents belonging to a document repository into topical documents and non-topical documents. These principles include the creation of a set of hand-crafted topical text patterns and topical anti-patterns. These principles can be applicable to classifying documents from any appropriate repository as well ranking those documents. The principles described herein include using a topical pattern and a topical anti-pattern based classifier for topic based classification of documents that uses frequent pattern growth procedures.

In one instance, the principles described herein include a method for classifying a document using identified patterns. Such a method may include identifying a first group of resources to determine frequent patterns related to a topical classification, identifying a second group of resources to determine frequent anti-patterns that are related to a non-topical classification, and classifying a document based on the frequent patterns and the frequent anti-patterns.

In another instance, the principles described herein include a system for classifying a document using the identified patterns. Such a system can include a patterns engine to identify a first group of resources for determining frequent patterns related to a topical classification, an anti-patterns engine to identify a second group of resources for determining frequent anti-patterns that are related to a non-topical classification, a topical probability engine to determine a topical probability that the document describes the topical classification based on the frequent patterns, and a non-topical probability engine to determine a non-topical probability that the document describes the non-topical classification based on the frequent anti-patterns.

In yet another instance, the principles described herein includes a computer program product for classifying a document using identified patterns. Such a product includes a non-transitory computer readable storage medium that includes program instructions that, when executed, causes a processor to determine frequent patterns related to a topical classification based on a first group of resources, determine frequent anti-patterns that are related to a non-topical classification based on a second group of resources, and classify a document based on the frequent patterns and the frequent anti-patterns.

Figures 1, 2:
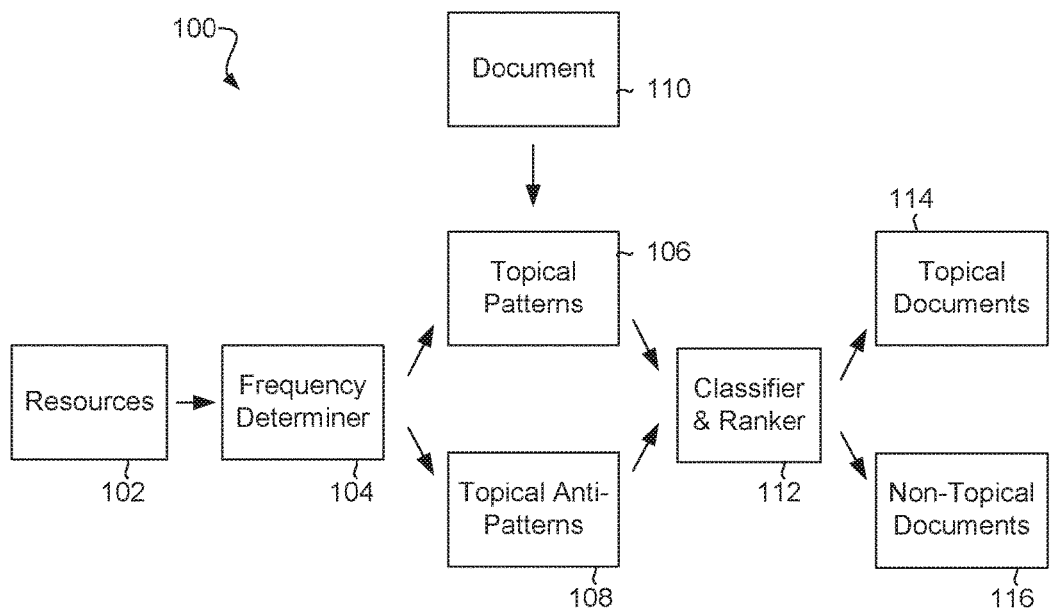
FIG. 1 is a diagram of an example of a classifying system according to the principles described herein.
FIG. 2 is a chart of an example of resource transactions according to the principles described herein.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples, FIG. 1 is a diagram of an example of a classifying system (100) according to the principles described herein. In this example, resources (102) are subjected to a frequency determiner (104) where topical patterns (106) and topical anti-patterns (108) are identified. A document (110) is compared to the topical patterns (106) and topical anti-patterns (108) where a classifier and ranker (112) determines whether to classify the document as a topical document (114) or a non-topical document (116).

The resources (102) may be any appropriate resource that can be used to determine patterns and anti-patterns. For example, the resources may include websites, electronic documents, books, audio files, written documents, other resources, portions thereof, or combinations thereof. The resources may include multiple groups that are intended to determine different types of patterns. For example, a first group of resources may be used to determine frequent patterns in documents that an individual would consider to be part of the topic of interest. The individual may select a website, or just a portion of the website, that appears to be on topic. The frequency determiner (104) scans the selected website or portions thereof to identify the patterns that are repeated throughout. For example, the frequency determiner (104) may determine that the term "push-ups," "calories," "heart rate," "exercise," and "running" are terms that are repeated through the selected resources that are on topic. As such "push-ups," "calories," "heart rate," "exercise," and "running" may be identified as topical patterns (106) for the topic of exercise.

Likewise, a second group of resources may be used to determine frequent patterns in documents that the individual would not consider to be part of the topic of interest. The individual may select another website, or a different portion of the website used in the first group, that appears to be unrelated to the topic of interest. The frequency determiner (104) scans the selected resources in the second group to identify the anti-patterns that are repeated throughout. For example, the frequency determiner (104) may determine that the term "sugar," "late night movie," "comfort," "take-out menu," and "video games" are terms that are repeated through the selected resources. As such "sugar," "late night movie," "comfort," "take-out menu," and "video games" may be identified as anti-topical patterns (108), which are considered to be patterns that would not usually have a high frequency in the topic of exercise.

A document (110) may be compared against the topical patterns (106) and topical anti-patterns (108). In one implementation, during such comparisons, the document is compared to the topical patterns (106). For each term or phrase in the document (110) that matches one of the patterns, a counter may be incremented by one. The total count may be used to determine the topical probability that the document describes the topic. The topical probability may range from 0 to 1, where 1 represents a high probability that the document (110) describes the topic, and 0 represents a low probability that the document (110) describes the topic. Likewise, the document is compared to the topical anti-patterns (108). For each term or phrase in the document (110) that matches one of the anti-patterns, another counter may be incremented by one. This count may be used to determine the non-topical probability that the document describes something other than the topic. The non-topical probability may range from 0 to 1, where 1 represents a high probability that the document (110) describes a non-topic, and 0 represents a low probability that the document (110) describes a non-topic.

The classifier and ranker (112) may determine confidence scores for the documents. In one example, the classifier and ranker (112) may subtract the non-topical probability from the topical probability for a given document (110). The resulting overall probability can be a confidence score for the document (110). If the confidence score is positive, the classifier classifies the document (110) as a topical document (114). On the other hand, if the confidence score is negative, the classifier classifies the document (110) as a non-topical document (116).

The ranker can rank the topical documents (114) based on their confidence scores. For example, the ranker may rank a first document with a highest score of 0.73 as the first ranked document. Likewise, a second document with a confidence score of 0.57 and a third document of 0.45 can be ranked as second and third respectively. In this manner, a user searching for a document on the identified topic can use ranks to guide his search. In some examples, the confidence scores are visible to the users while performing the search. In other examples, the confidence scores are not visible to the users, but are factored into how the topical documents are presented to the user, such as the sorted order of search results from a user's search query.

FIGS. 2-6 will now be described to illustrate the generation of frequent pattern trees, frequent pattern item sets, and frequent anti-pattern item sets in one example, according to the principles described herein.

FIG. 2 is a chart (200) of resource transactions, according to an example. In this example, the chart (200) includes a first column (202) that depicts a number of transactions and a second column (204) that depicts the repeated terms from each transaction.

A transaction may be any appropriate block of words. For example, a transaction may be a sentence, multiple sentences, a word, multiple words, a phrase, multiple phrases, a predetermined number of words, another type of block of words, or combinations thereof. The classifying system may remove words within the block that are predetermined to be unhelpful for determining the document's topic. For example, words like "and," "the," "a," "but," and so forth may be removed. In some cases, the articles, contractions, pronouns, predetermined adjectives, predetermined nouns, other words, or combinations thereof are removed. The classifying system may compare the words in each of the transactions and remove terms that are not repeated at a predetermined threshold value. For example, the term "person" remains in the first transaction because "person" was repeated in seven other transactions. Likewise, the term "professional" remains in the first transaction because "professional" was repeated in six other transactions. Thus, just "person" and "professional" from the first transaction remain because the other terms were not repeated in the other transactions.

Figure 3:
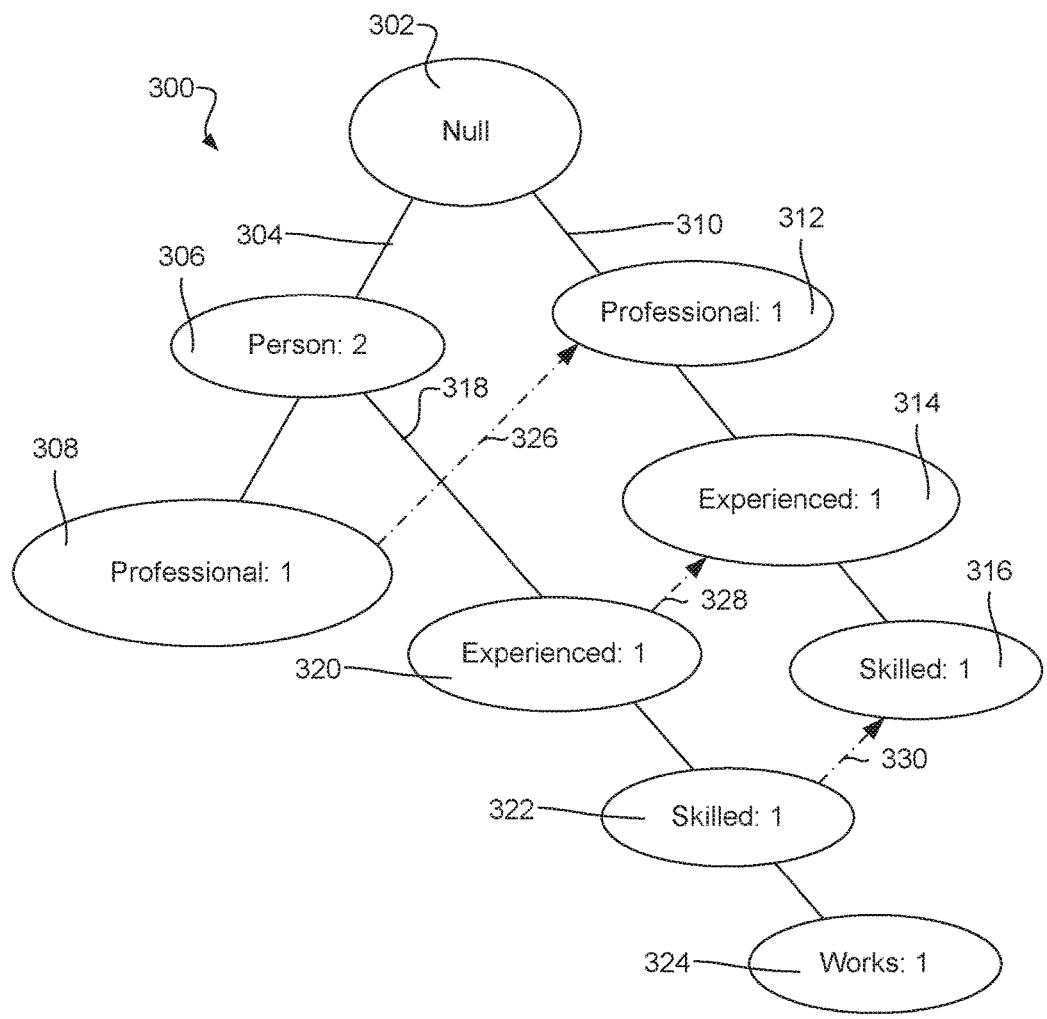
FIG. 3 is a diagram of an example of representing repeated terms according to the principles described herein.

FIG. 3 is a diagram representing repeated terms, according to an example. In this example, a frequent pattern tree (300) is being constructed. The tree (300) has a root node (302) where some of the branches for each of the transactions from the chart (200, FIG. 2) begin. In the example of FIG. 3, the first three transactions from the chart (200, FIG. 2) are depicted.

The first transaction in the chart (200, FIG. 2) is depicted in a first branch (304) with a first node (306) representing "person" and a second node (308) representing "professional." A second branch (310) represents the second transaction from the chart (200, FIG. 2) with a third node (312) representing "professional," a fourth node (314) representing "experienced," and a fifth node (316) representing "skilled," A third branch (318) shares the first node (306) with the first branch (304) because the first and third transactions both start with "people." The third branch (318) also includes a sixth node (320) representing "experienced," a seventh node (322) representing "skilled," and an eighth node (324) representing "works."

A link formed between nodes represents the same terms. For example, a first link (326) is formed between the second node (308) and the third node (312) because they both represent "professional." Likewise, a second link (328) is formed between the fourth node (314) and the sixth node (320) because they both represent "experienced." Also, a third link (330) is formed between the fifth node (316) and the seventh node (322) because they both represent "skilled." The links can be used to facilitate grouping of the nodes that represent the same terms. In the example of FIG. 3, the tree (300) is just an intermediate representation of a final tree that will eventually include each of the transactions from the chart (200, FIG. 2).

Figure 4:
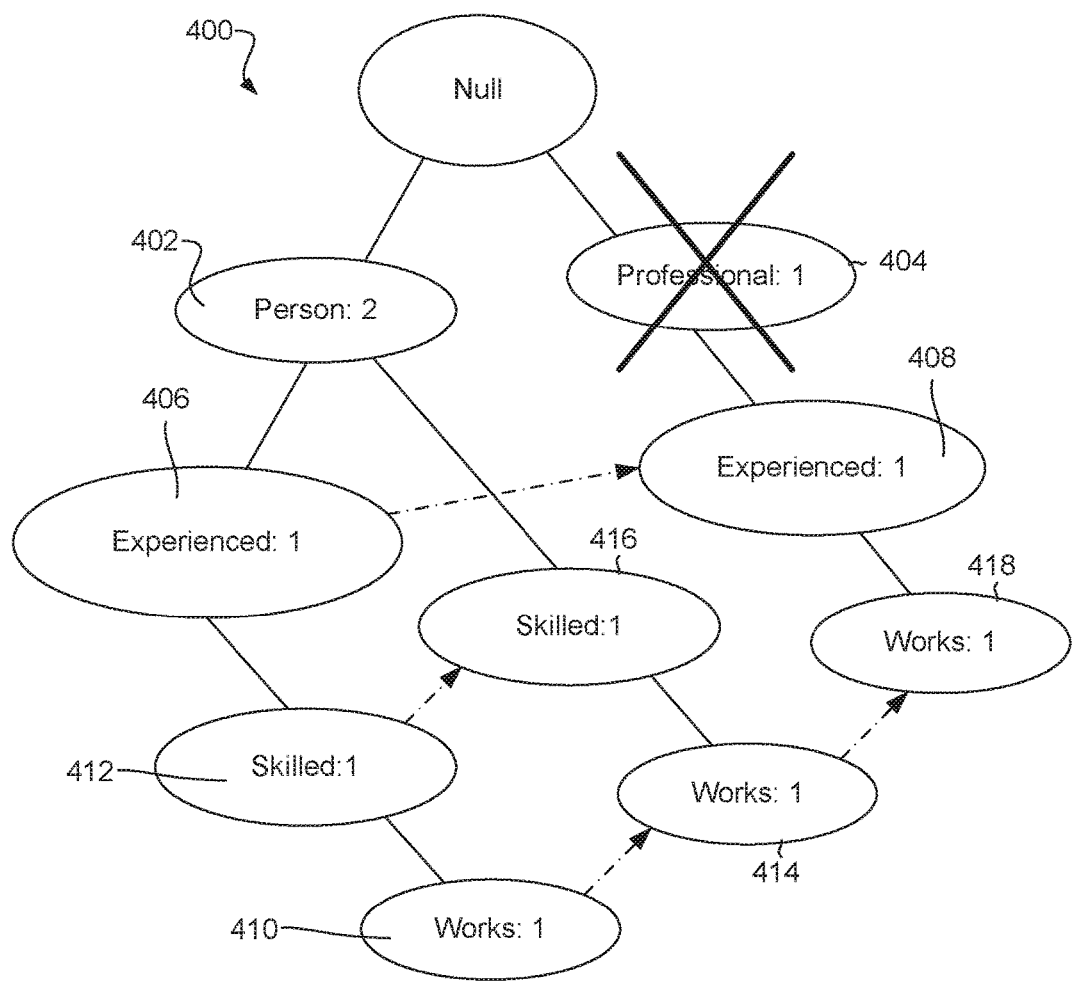
FIG. 4 is a diagram of an example of a frequent pattern tree according to the principles described herein.

FIG. 4 is a diagram of an example of a frequent pattern tree (400), according to the principles described herein. In this example, the tree (400) represents multiple stages of processing.

First, the tree (400) was built to include a branch for each of the transactions. An intermediate tree (not shown) included eight branches that shared the first node (402) because "person" was the first item in eight different transactions. Thus, the count for the first node (402) is eight. Likewise, other nodes that include a higher count are nodes that were shared by different branches.

Second, each of the branches that did not include a node that represents "works" was removed. Thus, the example of FIG. 4 includes a tree (400) that represents just the transactions that include "works." While this example is explained with reference to a tree that includes just the transactions that include works, another tree will be processed for each of the other terms in the transactions. Thus, the following procedure in relation to a tree dedicated to "works" is followed by the other trees dedicated to other repeated terms.

Third, the counts in each of the nodes are updated to reflect just the counts with the present tree (400). Thus, all counts will be decremented to 1, expect for the first node (402), which is decremented to 2.

Fourth, those nodes that include terms with a cumulative count less than a predetermined threshold are removed. In examples where the predetermined threshold is 2, just a second node (404) that includes the term "professional" is removed because the cumulative count is 1. The first node (402) is not removed even though it is the single node representing "person" because the count in the first node (402) is 2. Likewise, a third node (406) and fourth node (408) are not removed, even though the count in each of these nodes (406, 408) is just 1, because cumulatively the count is 2. The count of third and fourth nodes are added together because the third and fourth nodes (406, 408) both represent "experienced," While this example has been described with reference to a specific predetermined threshold value of 2, any appropriate value may be used in accordance with the principles described herein.

Fifth, the remaining branches are used to identity frequent items sets for the term works. An item set is more than a frequent term; it includes terms that are used together in the resources. In the example of FIG. 4, starting at the first "works" node (410), the branch is followed to the adjacent node (412) that represents "skilled." At this point, a frequent item set is determined: {skilled, works}, Next, the second "works" node (414) is followed to its adjacent node (416), which also represents "skilled." Since "skilled works" is already identified as a frequent item, the branch is continued to the first node (402), which represents "person." At this point, another frequent item set is determined: {person, skilled, works}. Likewise, the third "works" node (418) can be used to determine another frequent item set: {experienced, works}.

These recursive processes may be followed with the trees that are dedicated to the other repeated terms from the chart (200, FIG. 2). While the example of FIG. 4 is dedicated to determining frequent item sets for the term "works," the other trees will determine the frequent item sets for the other terms in the chart (200, FIG. 2).

Figure 5:
FIG. 5 is a chart of an example of frequent pattern item sets according to the principles described herein.

FIG. 5 is a chart (500) of an example of frequent pattern item sets, according to the principles described herein. In this example, frequent item sets are depicted that were derived from the frequent pattern tree. In this example, the frequent item sets are derived for those patterns that are likely to be frequent in documents describing the topic of human services.

Figure 6:
FIG. 6 is a chart of an example of frequent anti-pattern item sets according to the principles described herein.

FIG. 6 is a chart (600) of an example of frequent anti-pattern item sets, according to the principles described herein. In this example, the frequent anti-patterns were derived through a similar process as the frequent pattern item sets. Here, the frequent anti-pattern item sets are those item sets that are likely to be frequent in documents that are describing a topic that does not include human services.

While the examples above have described a specific procedure for determining frequent terms and also frequent item sets for both documents relating to both topics and non-topics, any appropriate procedure may be used to determine frequent terms and also frequent item sets for both documents relating to topics and non-topics. For example, other analytical procedures, mathematic procedures, probabilities procedures, matching procedures, other types of procedures, or combinations thereof may be used.

Figure 7:
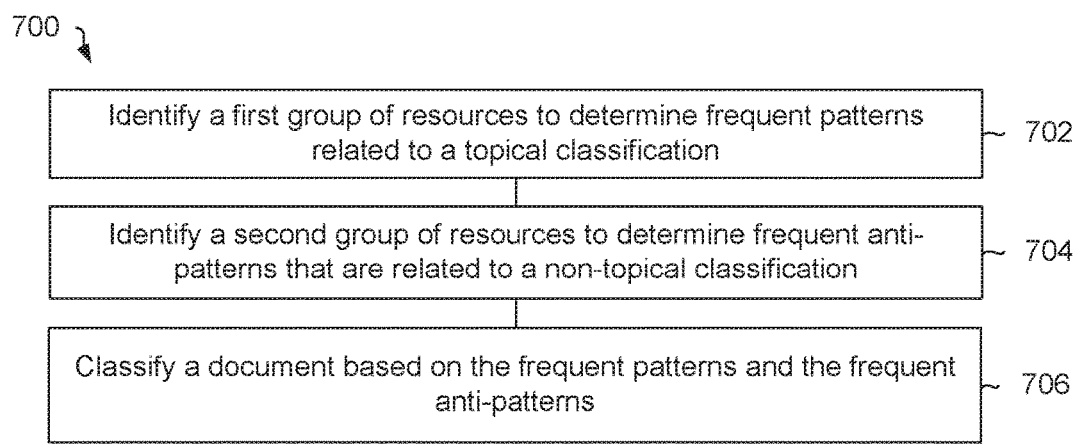
FIG. 7 is a diagram of an example of a method of classifying a document using identified patterns according to the principles described herein.

FIG. 7 is a diagram of an example of a method (700) of classifying a document using identified patterns, according to the principles described herein. In this example, the method (700) includes identifying (702) a first group of resources to determine frequent patterns related to a topical classification, identifying (704) a second group of resources to determine frequent anti-patterns that are related to a non-topical classification, and classifying (706) a document based on the frequent patterns and the frequent anti-patterns.

In some examples, a user can identify a group of resources that describe a topic of interest to the user. The group of resources may be any appropriate amount. In some examples, the group of resources includes a single document. In other examples, the group of resources includes multiple documents or other types of resources. The user can also identify another group of resources that describes the non-topics.

After identifying the patterns and the anti-patterns, a document to be classified is compared to the patterns and anti-patterns. In some examples, a small set of documents from a document repository are selected as the documents to be the first and second group of resources that describe the topic of interest and the non-topics. After identifying the patterns and anti-patterns from this group, each of the documents from the repository is compared to the patterns and anti-patterns. In this manner, each of the documents or at least a group of the documents in the repository is classified according to the topical classification and non-topical classification.

A document to be classified may be parsed into a set of paragraphs which are then broken down into a set of sentences, and then into a set of words. Then, the number of matches for each lexicon in the pattern and anti-pattern can be computed. Once this is done, the probability of occurrence of patterns and anti-patterns is computed and normalized. Then a converged statistic is computed, which may lie in the range $[-1, 1]$. In such an example, a value above zero indicates that the document is likely about the topic and a value less than zero indicates that the document is likely not about the topic. The computed probability serves as the basis for ranking the documents.

In a non-limiting example, the process of determining the frequent item sets in the patterns or anti-patterns include creating a transaction for all the documents desired to establish the patterns and anti-patterns and counting the frequency of each element across all transactions. A predetermined threshold value is used to determine whether an element is considered frequent. Next, the elements in the transaction are sorted by descending order of their frequency. This is repeated for the other transactions.

Next, the frequent pattern tree is constructed based on the transactions with branches and nodes as described above. A count is included in each node that represents the number of terms that the node represents. A frequent item set is generated based on the conditional trees as described above, and the conditional trees are used to find the frequent item sets ending in each of the selected terms. These processes can be repeated to create the frequent item sets for the anti-patterns.

Next, a match probability for a document is calculated based on the frequent item sets of the patterns. The match probability is generated by creating a unique list of words present in a paragraph (or other selected portion) of the document. Those words are compared to the frequent item sets from the patterns. Based on the matches between words in the paragraph and the words in the item sets, the probability is calculated for each term in the item sets. The process is repeated for all of the paragraphs in the document. An overall probability is derived by calculating a weighted average of each of the probabilities for each paragraph. A probability for the anti-pattern can be derived following the same or a similar procedure.

The confidence score is determined by finding the overall probability, which is determined by subtracting the probability associated with the anti-patterns from the probability associated with the patterns. If the overall probability is greater than zero, then the document is classified as the topic. Otherwise, the document can be classified as a non-topic.

Figure 8:
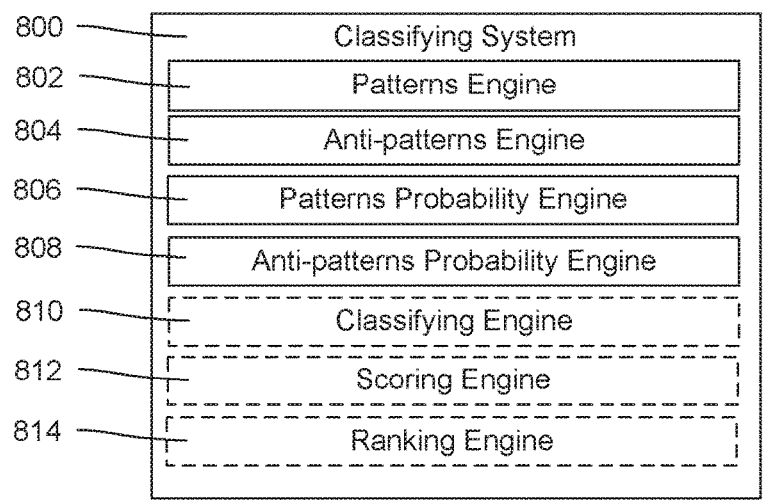
FIG. 8 is a diagram of an example of a classifying system according to the principles described herein.

FIG. 8 is a diagram of an example of a classifying system (800) according to the principles described herein. The classifying system (800) has a patterns engine (802), an anti-patterns engine (804), a patterns probability engine (806), and an anti-patterns probability engine (808). In this example, the classifying system (800) further includes a classifying engine (810), a scoring engine (812), and a ranking engine (814). The engines (802, 804, 806, 808, 810, 812, 814) refer to a combination of hardware and program instructions to perform a designated function. Each of the engines (802, 804, 806, 808, 810, 812, 814) may include a processor and memory. The program instructions are stored in the memory and cause the processor to execute the designated function of the engine.

The patterns engine (802) determines the frequent item sets associated with the topic. The anti-patterns engine (804) determines the frequent item set associated with the non-topics. The patterns probability engine (806) determines the probability that a specific document is associated with the topic. The anti-patterns probability engine (808) determines the probability that the specific document is associated with a non-topic.

The scoring engine (812) scores the document based on the difference between the probabilities determined by the patterns probability engine (806) and the anti-patterns probability engine (808). The classifying engine (810) classifies the document based on the score. For example, the classifying engine (810) may classify the document as a topical document if the score is positive. In some instances, the classifying engine (810) may classify a document as a non-topical document if the score is negative. The ranking engine (814) ranks the documents in the topical classification based on the score.

Figure 9:
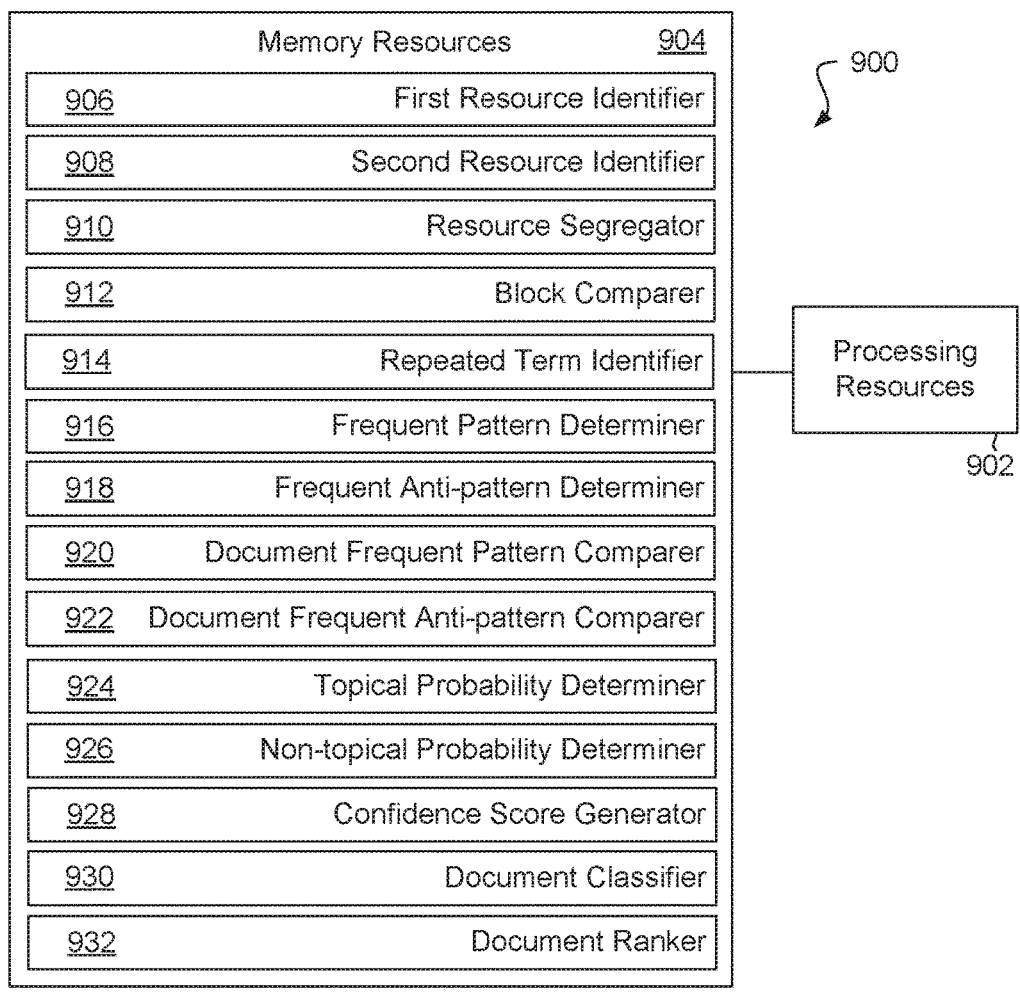
FIG. 9 is a diagram of an example of a classifying system according to the principles described herein.

FIG. 9 is a diagram of an example of a classifying system according to the principles described herein. In this example, the classifying system (900) includes processing resources (902) that are in communication with memory resources (904). Processing resources (902) include at least one processor and other resources used to process programmed instructions. The memory resources (904) represent generally any memory capable of storing data such as programmed instructions or data structures used by the classifying system (900). The programmed instructions shown stored in the memory resources (904) include a first resource identifier (906), a second resource identifier (908), a resource segregator (910), a block comparer (912), a repeated term identifier (914), a frequent pattern determiner (916), a frequent anti-pattern determiner (918), a document frequent pattern comparer (920), a document frequent anti-pattern comparer (922), a topical probability determiner (924), a non-topical probability determiner (926), a confidence score generator (928), a document classifier (930), and a document ranker (932).

The memory resources (904) include a computer readable storage medium that contains computer readable program code to cause tasks to be executed by the processing resources (902). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The first resource identifier (906) represents programmed instructions that, when executed, cause the processing resources (902) to identify a first resource to determine the frequent patterns associated with the topic. The second resource identifier (908) represents programmed instructions that, when executed, cause the processing resources (902) to identify a second resource to determine the frequent anti-patterns associated with the non-topic.

The resource segregator (910) represents programmed instructions that, when executed, cause the processing resources (902) to segregate either the first and/or the second resource into transactions, such as sentences or other blocks of words. The block comparer (912) represents programmed instructions that, when executed, cause the processing resources (902) to compare the blocks of words to determine which words are frequently used in the resources. The repeated term identifier (914) represents programmed instructions that, when executed, cause the processing resources (902) to identify the repeated words based on the comparison. The frequent pattern determiner (916) represents programmed instructions that, when executed, cause the processing resources (902) to determine the frequent patterns based on the repeated words from the first resource. The frequent anti-pattern determiner (918) represents programmed instructions that, when executed, cause the processing resources (902) to determine the frequent anti-patterns based on the repeated words from the second resource.

The document frequent pattern comparer (920) represents programmed instructions that, when executed, cause the processing resources (902) to determine matches between the frequent patterns and the document. The document frequent pattern comparer (922) represents programmed instructions that, when executed, cause the processing resources (902) to determine matches between the frequent anti-patterns and the document. The topical probability determiner (924) represents programmed instructions that, when executed, cause the processing resources (902) to determine the probability that the document describes the topic. The non-topical probability determiner (926) represents programmed instructions that, when executed, cause the processing resources (902) to determine the probability that the document describes a non-topic.

The confidence score generator (928) represents programmed instructions that, when executed, cause the processing resources (902) to generate a score based on the difference between the probabilities calculated by the topical probability determiner (924) and non-topical probability determiner (926). The document classifier (930) represents programmed instructions that, when executed, cause the processing resources (902) to classify the document based on the score. The document ranker (932) represents programmed instructions that, when executed, cause the processing resources (902) to rank the document based on the score.

Further, the memory resources (904) may be part of an installation package. In response to installing the installation package, the programmed instructions of the memory resources (904) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed, Here, the memory resources can include integrated memory such as a hard drive, a solid state hard drive, or the like.

In some examples, the processing resources (902) and the memory resources (904) are located within the same physical component, such as a server, or a network component. The memory resources (904) may be part of the physical component's main memory, caches, registers, non-volatile memory, or elsewhere in the physical component's memory hierarchy. Alternatively, the memory resources (904) may be in communication with the processing resources (902) over a network. Further, the data structures, such as the libraries and may be accessed from a remote location over a network connection while the programmed instructions are located locally. Thus, the classifying system (900) may be implemented on a user device, on a server, on a collection of servers, or combinations thereof.

The classifying system (900) of FIG. 9 may be part of a general purpose computer. However, in alternative examples, the classifying system (900) is part of an application specific integrated circuit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method, comprising:
    determining, by a computing device, frequent patterns based on a first group of resources, wherein the frequent patterns comprise sets of words associated with resources that are related to a particular topic;
    determining, by the computing device, frequent anti-patterns based on a second group of resources, wherein the frequent anti-patterns comprise sets of words associated with resources that are not related to the particular topic, wherein the second group of resources is different from the first group of resources;
    determining, by the computing device, a probability that a document is related to the particular topic based on the frequent patterns and the frequent anti-patterns; and
    determining, by the computing device, a topic classification of the document based on the determined probability.

2. The method of claim 1, wherein a first frequent pattern comprises a single word included in multiple resources of the first group of resources, wherein a quantity of the multiple resources including the single word exceeds a minimum threshold.

3. The method of claim 2, wherein a first frequent anti-pattern comprises a pair of words included in multiple resources of the second group of resources, wherein a quantity of the multiple resources including the pair of words exceeds the minimum threshold.

4. The method of claim 1, comprising:
    comparing sets of words of the document to the frequent patterns; and
    for each set of words of the document that matches one of the frequent patterns, incrementing a first counter by one.

5. The method of claim 4, comprising:
    comparing the sets of words of the document to the frequent anti-patterns; and
    for each set of words of the document that matches one of the frequent anti-patterns, incrementing a second counter by one.

6. The method of claim 5, comprising:
    calculating a difference by subtracting a value of the second counter from a value of the first counter; and
    determining the probability that the document is related to the particular topic based on the calculated difference.

7. A system, comprising:
    a processor; and
    a storage device storing instructions, the instructions executable by the processor to:
        determine frequent patterns based on a first group of resources, wherein the frequent patterns comprise sets of words associated with resources that are related to a particular topic;
        determine frequent anti-patterns based on a second group of resources, wherein the frequent anti-patterns comprise sets of words associated with resources that are not related to the particular topic, wherein the second group of resources is different from the first group of resources;
        determine a first probability that a document is related to the particular topic based on the frequent patterns;
        determine a second probability that the document is not related to the particular topic based on the frequent anti-patterns; and
        determine a topic classification of the document based on the first probability and the second probability.

8. The system of claim 7, wherein a first frequent pattern comprises a single word included in multiple resources of the first group of resources, wherein a quantity of the multiple resources including the single word exceeds a minimum threshold.

9. The system of claim 8, wherein a first frequent anti-pattern comprises a pair of words included in multiple resources of the second group of resources, wherein a quantity of the multiple resources including the pair of words exceeds the minimum threshold.

10. The system of claim 8, the instructions executable by the processor to:
    compare sets of words of the document to the frequent patterns; and
    for each set of words of the document that matches one of the frequent patterns, increment a first counter by one.

11. The system of claim 7, the instructions executable by the processor to:
    compare sets of words of the document to the frequent patterns; and
    for each set of words of the document that matches one of the frequent patterns, increment a first counter by one.

12. The system of claim 11, the instructions executable by the processor to:
    compare the sets of words of the document to the frequent anti-patterns; and for each set of words of the document that matches one of the frequent anti-patterns, increment a second counter by one.

13. The system of claim 12, the instructions executable by the processor to:
  calculate a difference by subtracting a value of the second counter from a value of the first counter; and
  determine the probability that the document is related to the particular topic based on the calculated difference.

14. A computer program product, comprising:
  a non-transitory computer readable storage medium that comprises program instructions that, when executed, causes a processor to:
    determine frequent patterns based on a first group of resources, wherein the frequent patterns comprise sets of words associated with resources that are related to a particular topic;
    determine frequent anti-patterns based on a second group of resources, wherein the frequent anti-patterns comprise sets of words associated with resources that are not related to the particular topic, wherein the second group of resources is different from the first group of resources;
    determine a probability that a document is related to the particular topic based on the frequent patterns and the frequent anti-patterns; and
    determine a topic classification of the document based on the determined probability.

15. The computer program product of claim 14, wherein a first frequent pattern comprises a single word included in multiple resources of the first group of resources, wherein a quantity of the multiple resources including the single word exceeds a minimum threshold.

16. The computer program product of claim 15, wherein a first frequent anti-pattern comprises a pair of words included in multiple resources of the second group of resources, wherein a quantity of the multiple resources including the pair of words exceeds the minimum threshold.

17. The computer program product of claim 16, wherein a second frequent pattern comprises a set of three words included in multiple resources of the first group of resources, wherein a quantity of the multiple resources including the set of three words exceeds the minimum threshold.

18. The computer program product of claim 14, further comprising program instructions that, when executed, causes the processor to:
  compare the sets of words of the document to the frequent patterns; and
  for each set of words of the document that matches one of the frequent patterns, increment a first counter by one.

19. The computer program product of claim 18, further comprising program instructions that, when executed, causes the processor to:
  compare the sets of words of the document to the frequent anti-patterns; and
  for each set of words of the document that matches one of the frequent anti-patterns, increment a second counter by one.

20. The computer program product of claim 19, further comprising program instructions that, when executed, causes the processor to:
  calculate a difference by subtracting a value of the second counter from a value of the first counter; and
  determine the probability that the document is related to the particular topic based on the calculated difference.

* * * * *

UNITED STATES PATENT AND TRADEMARK OFFICE
CERTIFICATE OF CORRECTION

PATENT NO. : 10,552,459 B2
APPLICATION NO. : 15/027776
DATED : February 4, 2020
INVENTOR(S) : Raghu Anantharangachar et al.

Page 1 of 1

It is certified that error appears in the above-identified patent and that said Letters Patent is hereby corrected as shown below:

In the Claims

Column 11:
Line 8, "determine the probability..." should be --determine the first probability....--

Signed and Sealed this
Tenth Day of March, 2020

Andrei Iancu
*Director of the United States Patent and Trademark Office*